Aug. 5, 1930.   O. G. SIMMONS   1,772,271
GEAR GRINDING MACHINE
Filed Nov. 22, 1928   3 Sheets-Sheet 1

INVENTOR:

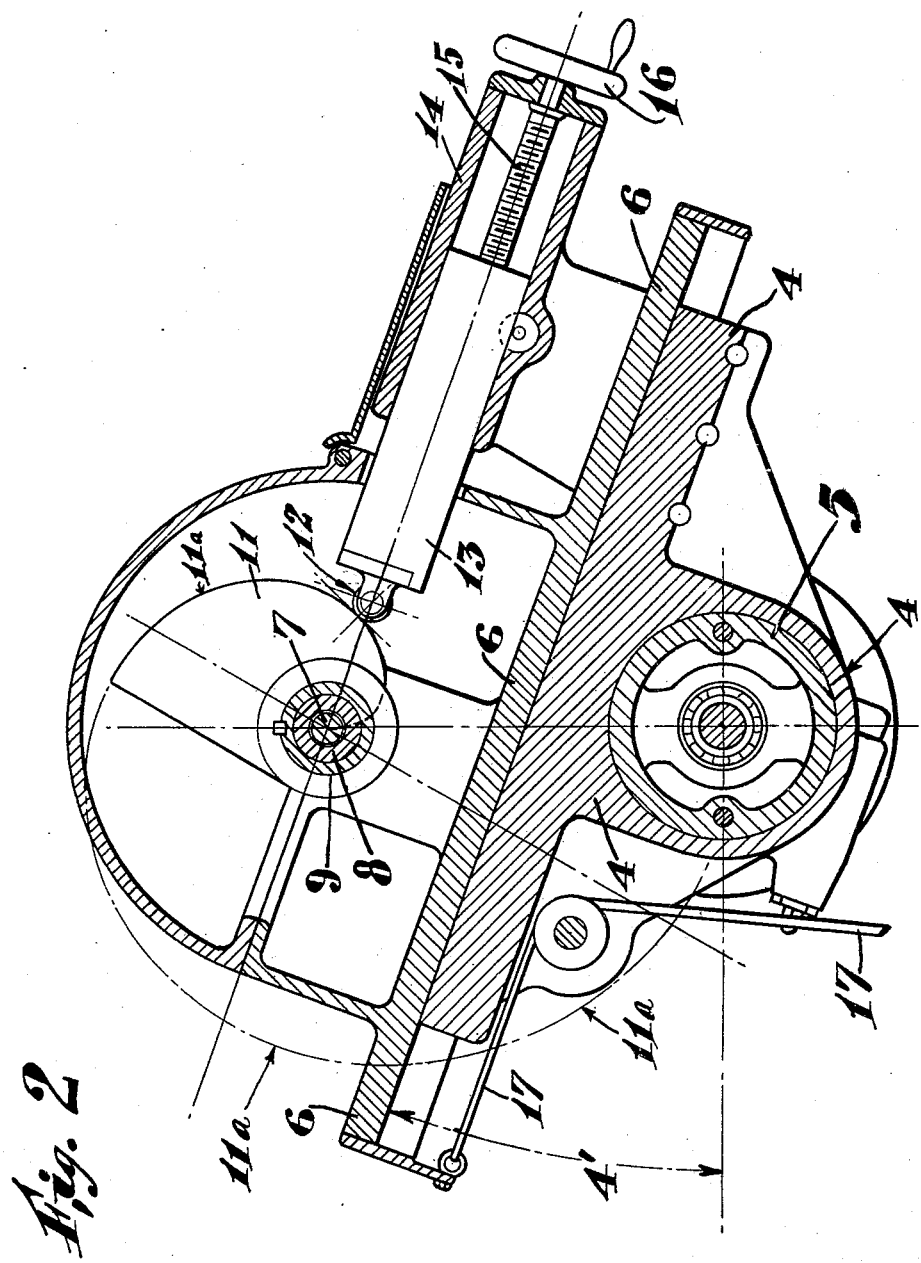

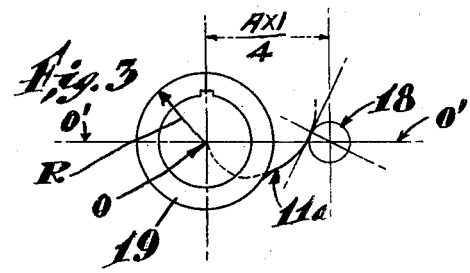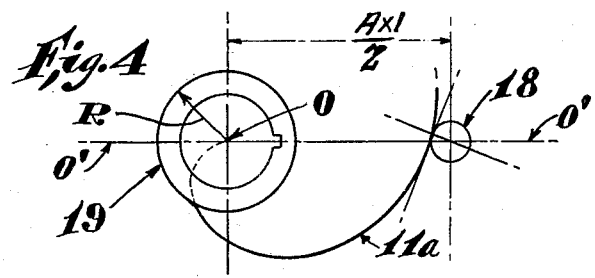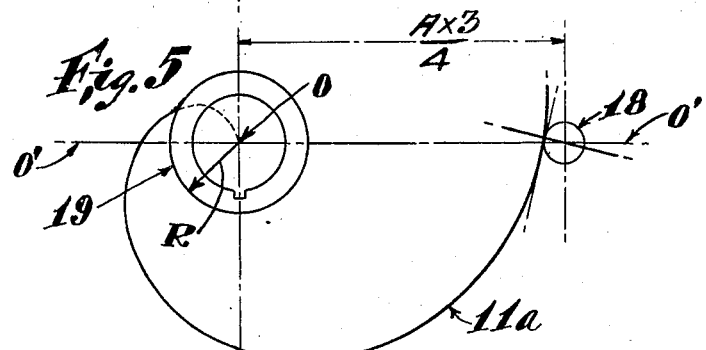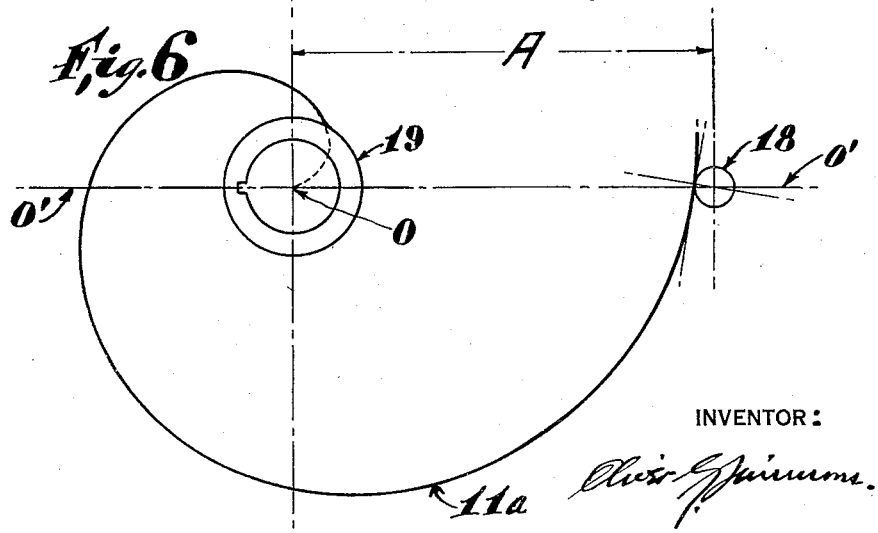

Patented Aug. 5, 1930

1,772,271

UNITED STATES PATENT OFFICE

OLIVER G. SIMMONS, OF LAKEWOOD, OHIO

GEAR-GRINDING MACHINE

Application filed November 22, 1928. Serial No. 321,075.

This invention relates to gear generating machines and more particularly to machines for generating gears, gear shaper cutters or the like having tooth faces of involute form, and it is to be understood that the term "gear" as hereinafter used is intended to include gear shaper cutters and other articles having the shape of a gear.

In my copending application Serial No. 98,791, filed March 31, 1926, I have disclosed a gear generating machine in which the gears of any desired pitch diameter and pressure angle may be generated and in which the rolling generating movement is imparted to the work spindle by means of a mechanism for oscillating the spindle about its axis and a spiral cam on the spindle which cooperated with a fixed abutment to impart a linear speed to the work spindle which is at all times proportional to its speed of angular movement.

In the machine above referred to, the work spindle carriage is adjustable about a horizontal axis to cause the gear blank to roll into and out of engagement with the cutting element with its axis moving in a plane at any desired inclination with respect to the plane of the cutting element so that gears of a given pitch diameter and with any desired pressure angle may be generated with a single movement controlling cam.

The present application is in part a continuation of the above mentioned application and the invention of the present application is an improvement over the machine disclosed in the above mentioned application in that the cam is so designed that any size cam may be used with the same roller abutment without altering the position of vertical adjustment of the roller, the axis of the roller being at all times in the plane of movement of the axis of the spindle.

The present invention has for its object to provide a cam of a form such that it will impart the desired linear movement to the work spindle by engagement with an abutment roller of a given diameter which has its axis in the plane of movement of the work spindle so that all sizes of cams will cooperate with the roller without vertical adjustment of the roller, thereby making it unnecessary to adjust the roller to different vertical positions with respect to the axis of the spindle for different sized cams and eliminating errors in tooth curvature which might be occasioned by an inaccurate adjustment of the roller.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 2 is a vertical section taken centrally through the work carriage and its support.

Figs. 3, 4, 5 and 6 are diagrammatic views illustrating the method of generating the cam.

Figure 1:
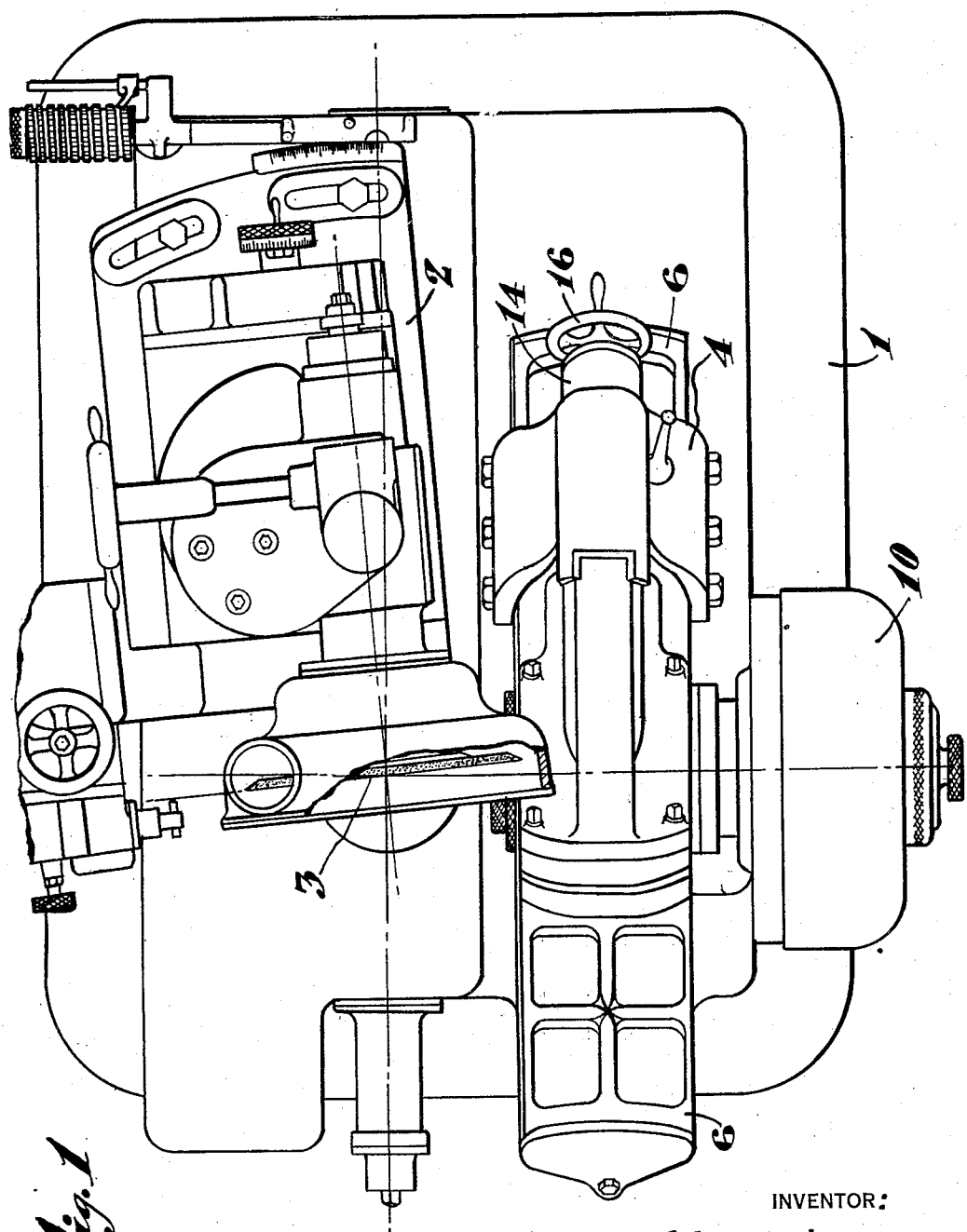
Fig. 1 is a plan view of the machine.

Referring to the accompanying drawings, the frame of the machine is indicated by the numeral 1 in Fig. 1 and upon this frame, there is mounted a head 2 which is angularly adjustable about a vertical axis and which forms a support for a cutting element which may be in the form of a grinding wheel 3 which has its grinding face disposed in a vertical plane.

At one side of the head 2, there is mounted a work support 4 which is adjustable angularly about a horizontally disposed cylindrical pivot 5. The head 2 may be adjusted and secured in any desired position of angular adjustment within the range of adjustment provided and the same is true of the work support 4, the angular adjustment of the head 2 adapting the machine to generate helical gears and the angular adjustment of the support 4 determining the pressure angle 4' of the gear. Mounted for longitudinal sliding movement on the support 4, there is a carriage 6 which carries a work spindle 7 to which the gear to be ground is attached.

The spindle 7 projects laterally through the carriage 6 and the gear to be ground is mounted on the end of the spindle which projects beneath the grinding wheel 3. During the operation of the machine, the spindle 7 is oscillated about its axis and the carriage 6 is simultaneously reciprocated on the support so that a movement is imparted to the gear being ground corresponding to a rolling movement along a rack, the gear moving into and out of engagement with the grinding wheel during reciprocating movement of the carriage. The face of the grinding wheel which engages the teeth of the gear is positioned in a vertical plane and by adjusting the support 4 angularly linear movement may be imparted to the gear at any desired angle with respect to the vertical. The linear and rotary movements of the gear along the inclined plane of the support correspond to the linear and rotary movements which the pitch cylinder of the gear would have in rolling without slippage along said plane.

In the operation of the machine, the gear is rolled into and out of engagement with the grinding wheel and during the portion of the reciprocating stroke of the work carriage in which the gear is out of engagement with the grinding wheel, an additional angular movement is imparted to the spindle through an angle corresponding to the angle between successive teeth of the gear to index the gear so that a different tooth is engaged by the grinding wheel in successive reciprocating movements of the carriage.

In order to permit indexing of the work spindle and to permit angular adjustments of the work spindle independently of the indexing and work reciprocating mechanisms, the spindle 7 is journaled within concentric sleeves 8 and 9, the inner sleeve 8 being operatively connected to the indexing mechanism and the outer sleeve 9 being operatively connected to suitable mechanism for continuously oscillating the same to impart reciprocating movements to the carriage 6.

The outer sleeve 9 is continuously oscillated and is connected to the inner sleeve 8 and spindle 7 during the portion of the stroke in which the gear tooth is being engaged by the grinding wheel. The inner sleeve 8 during the operation of the machine, is fixed to the spindle 7 and is at intervals given a turning movement independently of the outer sleeve 9 by means of indexing mechanism within the indexing head 10 to index the gear.

To the continuously oscillating sleeve 9, there is fixed a cam 11 which is formed on a spiral curve and engages with an abutment roller 12 of the given diameter which is positioned with its axis in the plane of movement of the axis of the spindle 7. The cam 11 is so formed that during the rotation of the cam toward the abutment 12, the rate of movement of the spindle 7 away from the axis of the abutment 12 is at all times proportional to the rate of angular movement of the cam and the lead of the cam is such that the linear and rotary movements of the spindle correspond to the rotary and linear movements of the pitch cylinder of the gear rolling without slippage on a plane parallel with the plane of movement of the spindle axis.

In order to impart the required rotary and linear movements to gears of different sizes, a different size cam usually is provided for gears of different pitch diameters. However, the tooth faces of a gear of a given pitch diameter may be generated to any desired pressure angle, the complement of the pressure angle of the involute tooth faces of the gear being always equal to the angle of adjustment of the support 4 with respect to the vertical grinding face of the grinding wheel 3. Thus with a cam 11 of the size required for a gear of a 4 inch pitch diameter, gears of 4 inch pitch diameter may be generated of involute faces of any desired pressure angle without changing the cam.

The abutment roller 12 is mounted upon a tail stock spindle 13 which is longitudinally movable in a tail stock 14 which is supported on the support 4 independently of the carriage 6 and the spindle 13 may be adjusted longitudinally of the tail stock 14 by means of a screw 15 operated by a handwheel 16. The longitudinal axis of the spindle 13 is radially disposed with respect to the axis of the spindle 7 so that in the adjustment of the roller, its axis is moved toward and away from the axis of the spindle in the plane of movement of the work spindle axis. This longitudinal adjustment of the roller enables flank fullness of gear shaper cutters to be controlled with precision facilitating the proper positioning of the stroke of the work spindle with respect to the grinding wheel face. Also, when different size cams are employed or when the angular position of the cam with respect to the spindle is changed, the reciprocating stroke of the carriage can be properly adjusted with respect to the grinding wheel for the purpose referred to.

The carriage 6 is yieldingly pressed toward the abutment roller 12 by means of gravity due to its own weight and the weight of a suitable counterbalance attached to the cable 17 so that as the cam 11 is rotated in the clockwise direction as viewed in Fig. 2, the spindle 7 is moved away from the above roller 12 and when the cam 11 is rotated in a counter clockwise direction, the spindle is moved by the counterbalance in the opposite direction, the surface 11ª of the cam 11 being at all times pressed against the surface of the roller 12.

Referring to Figs. 3 to 6 of the drawing, the curve 11ª of the cam 11 is generated by a rotary cylindrical milling cutter 18 of a given diameter by rotating the cam about an axis O at a uniform angular speed and engaging the cam blank with the cutter 18 which has its axis positioned in a radial line O' and which is moved at a uniform speed along the line O' during the turning movement of the blank. The linear speed of the cutting tool 18 will be equal to the angular speed of a point on the periphery of a circle of a given diameter having its center at the axis O of the blank, the diameter of this circle corresponding to the pitch diameter of a gear to be generated on the machine when the cam is used, a series of cams being provided for the various sizes of gears to be generated on the machine.

It is obvious to those skilled in this art that for a given gear of a given pitch diameter and given pressure angle resulting in a given base circle diameter, the pitch circle diameter may be changed without changing the characteristics of the given gear by simply selecting a different pressure angle the diameter of the base circle remaining the same. For example: a gear 7/9 diametral pitch, 3-1/7 inch pitch diameter, 22 teeth and 27-1/2 degrees pressure angle, is identical except for standard practice as regards tooth thickness with a gear of 7-1/3/9 diametral pitch, 3 inch pitch diameter, 22 teeth and 21 degrees 41 minutes pressure angle.

Thus a cam which is correct for a 3 inch pitch diameter gear may be used in the machine to grind the teeth of the gear characterized as first referred to above, by following the data given for the second one referred to. In this way, a given cam may be used by the mere expedient of expressing the terms of the gear data in terms of the selected pitch diameter for which the given cam has been designed.

With reference to Figs. 3 to 6 of the drawing, the cam 11 is provided with a curve 11ª which is the resultant of uniform movement of a cylinder 18 along the rectilinear line O'—O' in the plane of the axis O of the cam blank 11 with the uniform movement of the cam blank about its axis O to the end that the cylinder 18, for one turn of the cam blank 11, will have moved a measure of distance A, see Fig. 6, equal to the measure of the perimeter of a given circle. Thus Figs. 3 to 5 inclusive represent fractional turns of the cam blank about its axis with a corresponding movement of the cylinder 18; for example, Fig. 3 substantially illustrates the position of the cylinder 18 for 1/4 of a turn of the cam 11 so that the measure $\frac{A \times 1}{4}$ is 1/4 of the measure A shown in Fig. 6. In like manner Fig. 4 illustrates substantially the position of the cylinder 18 for 1/2 of a turn of the cam blank. Similarly Fig. 5 illustrates substantially the position of the cylinder 18 for 3/4 of a turn of the cam blank. The starting point of the cylinder 18, in generating the curve 11ª as referred to, is substantially adjacent the hub of the cam represented by the circle 19, a point on which is removed from the axis O by a measure of distance equal to the measure of radius R.

For purposes of illustration, the generating element has been illustrated as a grinding wheel, but as well understood in the art, the generating element may be a milling cutter or a planer tool providing the cutting edges operate in a plane corresponding to the plane of the grinding face of the grinding wheel shown, this plane being tangent to the involute of a gear tooth face during the generating operation, the rolling movement of the gear being such as to maintain the involute of the gear tooth face tangent to the fixed plane of the cutting element.

What I claim is:

1. A gear generating machine comprising a cutting element, a work carriage mounted for linear reciprocating movement transversely of the plane of the cutting element, a rotary work spindle mounted on the carriage and extending transversely of the direction of linear movement of the carriage, an abutment fixed with respect to the carriage, and a cam mounted on the work spindle to turn therewith, said cam having a peripheral abutment engaging face contacting with said abutment closely adjacent the plane of movement of the spindle, said engaging face being formed on a spiral curve such that, upon a turning movement of the spindle, to impart a linear movement is imparted to the carriage at a speed proportional to the speed of angular movement of the spindle.

2. A gear generating machine comprising a cutting element, a work carriage mounted for linear reciprocating movement transversely of the plane of the cutting element, a rotary work spindle mounted on the carriage and extending transversely of the direction of linear movement of the carriage, an abutment fixed with respect to the carriage, means for adjusting said abutment in the direction of movement of the carriage toward and away from the axis of the work spindle, a cam on the work spindle engaging said abutment adjacent the plane of movement of the spindle axis, said cam being formed on a spiral curve and cooperating with said abutment upon a turning movement of the spindle to impart a linear movement to the carriage at a speed proportional to the speed of angular movement of the spindle, and means connected to the work carriage for yieldably pressing the same toward said abutment.

3. A gear generating machine comprising a cutting element, a work carriage mounted for linear reciprocating movement transversely of the plane of the cutting element, a rotary work spindle mounted on the carriage and extending transversely of the direction of linear movement of the carriage, an abutment roller mounted on an axis fixed with respect to the carriage and lying in the plane of movement of the axis of the work spindle, and a cam mounted on the work spindle to turn therewith and having a peripheral face engaging said roller which is formed on a spiral curve such that an angular movement of the cam with the work spindle imparts to the carriage a linear movement proportional to the angular movement of the work spindle.

4. In a gear generating machine, a work carriage mounted for linear reciprocating movement, a rotatably mounted work spindle on said carriage extending transversely of the line of movement of the carriage, an abutment roller mounted in a fixed position with respect to said carriage with its axis in the plane of movement of the axis of the spindle, means for adjusting said roller toward and away from the axis of the spindle in said plane, means for actuating the carriage including a cam on the spindle engaging said roller, said cam having its roller engaging face formed on a curve such that it will impart a linear movement to the carriage at a speed proportional to the angular movement of the spindle, and means connected to the work carriage for yieldably pressing the same toward said abutment.

5. In a gear generating machine, a carriage support mounted for angular adjustment about a horizontal axis, a carriage mounted for linear reciprocating movement on said support, a transverse work spindle on said carriage, an abutment roller mounted on said support independently of the carriage to rotate about an axis fixed with respect to the carriage and positioned in the plane of movement of the axis of the spindle, and a cam mounted on said spindle to turn therewith and engaging said roller to impart a linear movement to the carriage when the spindle is turned, said cam having a roller engaging face formed on a spiral curve such that an angular movement of the work spindle and cam imparts a linear movement to the carriage proportional to the angular movement of the work spindle.

6. In a gear generating machine, a carriage support mounted for angular adjustment about a horizontal axis, a carriage mounted for linear reciprocating movement on said support, a transverse work spindle on said carriage, an abutment roller mounted on said support independently of the carriage with its axis in the plane of movement of the axis of the spindle, means for adjusting said roller radially with respect to the spindle and for holding the same in adjusted positions, and a cam on the work spindle engaging said abutment, said cam having a roller engaging face formed on a spiral curve such that the distance between the axes of the roller and spindle is increased at a uniform rate during uniform angular movement of the cam.

In testimony whereof I affix my signature.

OLIVER G. SIMMONS.